United States Patent [19]
Dieter et al.

[11] Patent Number: 5,792,514
[45] Date of Patent: Aug. 11, 1998

[54] METHOD FOR THE PRODUCTION OF COATINGS

[75] Inventors: Heinz Dieter, Gailberg; Markus Parusel, Messel; Werner Siol, Darmstadt, all of Germany

[73] Assignee: Roehm GmbH Chemische Fabrik, Darmstadt, Germany

[21] Appl. No.: 954,029

[22] Filed: Oct. 20, 1997

Related U.S. Application Data

[63] Continuation of Ser. No. 578,429, Dec. 26, 1995, abandoned.

[30] Foreign Application Priority Data

Dec. 23, 1994 [DE] Germany ............... 44 46 364.2

[51] Int. Cl.$^6$ ....................... B05D 3/02
[52] U.S. Cl. ....................... 427/195; 427/385.5
[58] Field of Search ................. 427/195, 385.5, 427/388.1, 389.7, 389.9, 394, 180, 189

[56] References Cited

U.S. PATENT DOCUMENTS 5,451,650  9/1995  Siol et al. ...................... 526/201

FOREIGN PATENT DOCUMENTS 0 030 440  6/1981  European Pat. Off. .
743328  11/1996  European Pat. Off. .
43 27 464  2/1995  Germany .

*Primary Examiner*—Erma Cameron
*Attorney, Agent, or Firm*—Oblon, Spivak, McClelland, Maier & Neustadt, P.C.

[57] ABSTRACT

The invention concerns a method for the production of surface coatings from monodisperse poly(meth)acrylate particles, produced by precipitation polymerization in a halogen-free solvent L in the presence of a block copolymer BCP, wherein the poly(meth)acrylate particles are synthesized from at least 60 wt % monomer units M of formula I:

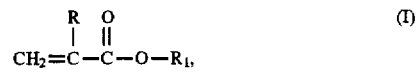

wherein R is hydrogen or methyl, and $R_1$ is an alkyl radical of 1 to 8 carbon atoms, a substituted aryl radical, or an aralkyl radical, wherein the resulting poly(meth)acrylate has a Vicat softening temperature VET according to ISO 306 between 30° and 110° C., and wherein the specific viscosity of the poly(meth)acrylate in chloroform at 25° C., according to DIN 51562, lies between 10 and 150 cm$^3$/g. The surface coatings are applied onto the substrate to be coated by application of a dispersion of poly(meth)acrylate particles and solvent L, which is subsequently evaporated, or by a powder coating with the isolated poly(meth)acrylate particles, which are subsequently melted.

10 Claims, No Drawings

METHOD FOR THE PRODUCTION OF COATINGS

This application is a continuation of application Ser. No. 08/578,429, filed on Dec. 26, 1995, now abandoned.

BACKGROUND OF THE INVENTION

1. Field of the Invention

The invention concerns a method for the production of coatings from meltable, monodisperse poly(meth)acrylate particles with particle diameters of 2–20 μm.

2. Discussion of the Background

There is a strong demand for plastics in the form of plastic particles with a defined, uniform particle size in the range between 2 and 20 μm.

The classical method for the production of defined plastic particles, emulsion polymerization, fails in this particle size range (see Ullmann's Encyclopedia of Industrial Chemistry, 5th Ed., Vol. A21, pp. 168, 373–387, Verlag Chemie, Weinheim, New York, 1992; Becker-Braun, *Kunststoff-Handbuch [Plastics Handbook]*, Vol. 1, pp. 26–28, Carl Hauser, Munich 1990). By means of emulsion polymerization, it is possible, generally, to produce only particles with a diameter of ≤2 μm without any problems. The efforts to produce larger particles generally lead to new particle formations, that is, to multimodal particle size distributions, with emulsion polymerization. According to the literature, it should be possible to produce particles in the aforementioned size range by emulsion polymerization by repeatedly allowing aqueous dispersions with monomers to swell, followed by their polymerization (see J. Ugelstad et al., Adv. Colloid Interface Sci. 13, 191 (1980)). The method indicated there, however, is extremely complicated. Even with the classical suspension polymerization, in which, as is known, the particle diameters are primarily controlled by the rate of stirring, particle diameters in the range between 5 and 15 μm are generally not possible. Moreover, such particles are not monodisperse, but rather are produced in a wide particle size distribution.

Substantially more favorable are the possibilities for obtaining poly(meth)acrylate particles with a diameter of 2–20 μm, if the particles are produced according to the principle of precipitation polymerization in an organic medium, using an organic distributor. The number of publications on this theme is correspondingly large. The precipitation polymerization of polymethyl methacrylate (PMMA) in hydrocarbons was already proposed 60 years ago (U.S. Pat. No. 2,135,443, DRP [German Reich Patent] 662,157). Over one hundred patents and numerous other literature references have dealt with the polymerization of alkyl (meth)acrylates in nonaqueous dispersions since then. In many of the pertinent patents, pure lacquer applications are described as stable, very fine particle dispersions. Moreover, there are also studies which investigate the influence of the emulsifiers, the initiators, and the solvent quality on particle size.

A very informative summary of the dispersion polymerization of methyl methacrylate in nonaqueous media is offered by M. A. Winnik et al. (Makromol. Chem. Macromol. Symp. 10/11, 483–501 (1987)). Above all, block copolymers are used as emulsifiers for dispersion polymerization. M. A. Winnik et al. (loc. cit., Table 1, p. 485) also give an overview of common polymerization conditions. As can be seen from this work also, the particle size can be controlled by means of the concentration of the emulsifier (FIG. 1), the initiator concentration (FIG. 5), the solids content (FIG. 3), and the solvent quality (FIG. 4). The figures there reveal that a regulation to particles with diameters >3 μm is possible, above all, with carbon tetrachloride/alkane mixtures. Without the addition of halohydrocarbons, areas are found, on the other hand, in which a particle size regulation is not possible at all. Here, coagulation is the result.

The use of halogenated hydrocarbons in the commercial area is possible only in a limited way because of ecological and toxicological reasons nowadays. The unpublished German Patent Application No. P 4327464.1 solves this problem by making available a method for the production of monodisperse poly(meth)acrylate particles according to the precipitation polymerization method, in which monomers M, containing at least 60 wt % alkyl (meth)acrylates with 1 to 8 carbon atoms in the ester radical, aryl (meth)acrylates or aralkyl (meth)acrylates, are polymerized in a halogen-free solvent L, consisting of at least 70 wt % and up to 100 wt % cyclohexane, in the presence of a block copolymer with polystyrene fractions BCP, in fractions of 0.1 to 10 wt %, based on the monomers and in the presence of a percarboxylic acid ester as an initiator in fractions of 0.02 to 2 wt %, based on the monomers. According to this method, particles with a refractive index in the range 1.48–1.58 and with particle sizes between 4 and 12 μm can be produced very well. Such particles are preferably crosslinked and are used for the surface refinement of molded articles or for working into molding materials to attain optical effects.

In the area of surface coating, there is also a need for dispersions which consist of particles with a monodisperse particle size and also have excellent film formation characteristics after the solvent is removed. In this connection, reference is made to the fact that with normal film formation with aqueous dispersion particles, the capillary forces in the gusset deform the particles and thus produce a closed film.

For every plastic dispersion, there is a certain minimum film formation temperature MFT (for the MFT, see DIN 53787). Very generally, it is true that the MFT must lie below the wet-bulb temperature. The plastic particles described here, on the other hand, can still be melted well even after removal of the solvent. The prerequisite for a good film formation is that the dispersion particles be arranged as uniformly as possible on the surface to be coated and that upon removal of the solvent and/or upon heating, the boundary areas of the particles disappear. This is true in particular for dry surface coatings, such as powder lacquers, in which the polymer particles are presently isolated.

DETAILED DESCRIPTION OF THE INVENTION

Surprisingly, monodisperse poly(meth)acrylate particles, which are produced according to the method described in P 4327464.1, characterized by the fact that monomers M, containing at least 60 wt % monomer of formula I:

wherein R is hydrogen or methyl, and $R_1$ is an alkyl radical with 1 to 8 carbon atoms, or a substituted aryl radical, or an aralkyl radical, are polymerized in a halogen-free solvent L as a continuous phase in the presence of an emulsifier and a radical initiator IN, exhibit very good characteristics, if the poly(meth)acrylates exhibit Vicat softening temperatures VET according to ISO 306 between 30° and 110° C., and specific viscosities in chloroform according to DIN 51562 between 10 and 150 cm³/g.

The solvent L may consist of at least 70 and up to 100 wt % cyclohexane; or at least 55 and up to 100 wt % of a compound of formulas II or III:

wherein $R_2$ is a straight-chain or branched alkyl radical of 5 to 23 carbon atoms, $R_3$ is hydrogen or a straight-chain or branched alkyl radical of 1 to 15 carbon atoms, and $R_4$ is a straight-chain or branched saturated alkyl radical of 10 to 22 carbon atoms; or 70 to 100 wt % mineral oil, wherein the mineral oil is preferably selected from the group of gas oils with a boiling range of 225°–350° C. (see DIN 51567).

The commercial product Shell Risella Oil G07 is such a mineral oil. If the particles, for example, are intended for use in coatings that may be in close contact with foods, aromaticfree mineral oils are selected, such as EXXSOL® D100S.

Preferably, the emulsifiers are block copolymers with polystyrene fractions BCP, which, based on monomers M, are used in fractions of 0.1 to 10 wt %. The block copolymers BCP are preferably synthesized from styrene and a hydrogenated polyisoprene or a hydrogenated polybutadiene.

Preferred radical initiators IN, which, based on the monomers M, are used in quantities of 0.01 to 2 wt %, are percarboxylic acid esters.

In another preferred specific embodiment of the invention, the monomers M consist of 20 to 100 wt % methyl methacrylate, based on M.

Preferably the monodisperse poly(meth)acrylate particles used in accordance with the invention have diameters in the range between 1 and 20 μm. The term "monodisperse" means that at least 80 wt %, preferably at least 90 wt %, of the particles lie within a size range of ±20% of the indicated average particle diameter, occasionally, lower fractions (less than 5 wt %) of fine particles can also be formed, which, however, are completely without importance in application technology.

The surface coatings in accordance with the invention are preferably produced by application of a dispersion and the subsequent evaporation of the solvent L or by powder coating with the poly(meth)acrylate particles isolated from the dispersion. A particular advantage is to be found in the fact that these particles with a diameter of 2–20 μm, produced by precipitation polymerization in an organic medium, can also be melted without the capillary effect of the solvent to form closed, high-quality films.

DESCRIPTION OF THE PREFERRED EMBODIMENTS

Monomers M used in accordance with the invention are, for example, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth) acrylate, amyl (meth)acrylate, n-hexyl (methy)acrylate, n-octyl (meth)acrylate, or 2-ethylhexyl (meth)acrylate. Preferably, the monomers M are 20 to 100 wt % methyl methacrylate and up to 80 wt % comonomers which lower the Vicat softening temperature VET of the copolymer, such as methyl acrylate, ethyl (meth)acrylate, butyl (meth) acrylate, isobutyl (meth)acrylate, or 2-ethylhexyl (meth) acrylate.

If required, aryl or aralkyl (meth)acrylates with 6 to 14 carbon atoms in the ester radical, in particular phenyl, tolyl, naphthyl, benzyl, or phenylethyl (meth)acrylates, are preferably used in proportions of 1 to 80 wt %, based on M, to increase the refractive index of the surface coating or to improve the adhesion of the surface coating on the substrate to be coated.

The fraction of vinyl aromatics, such as styrene or its homologs, should be limited to less than 20 wt %, based on M, since these monomers interfere with the course of the polymerization considerably. By the joint use of hydrophilic monomers, which can also improve the adhesion between surface coating and substrate, it is possible to regulate the particle size in the direction of the diminution of the particles. Such hydrophilic monomers are, for example, hydroxy esters of (meth)acrylic acid or alkyl-substituted aminoalkyl esters of (meth)acrylic acid with $C_1$ to $C_{12}$ alkyl radicals and the corresponding amides.

Hydrophobic comonomers, such as isobutyl methacrylate, phenyl methacrylate, or benzyl methacrylate, regulate the particle size in the direction of an enlargement of the particles.

As solvent L, corresponding to the continuous phase of the dispersion, cyclohexane is preferably used in fractions between 70 and 100 wt %, based on L, wherein smaller fractions (smaller than 30 wt %) of other solvents, for example, polar solvents, such as butyl acetate, can be contained in L.

In another preferred specific embodiment of the invention, compounds of formulas II or III:

wherein $R_2$ is a straight-chain or branched alkyl radical of 5 to 23 carbon atoms, $R_3$ is hydrogen or a straight-chain or branched alkyl radical of 1 to 15 carbon atoms, and $R_4$ is a straight-chain or branched saturated alkyl radical of 10 to 22 carbon atoms, are used as solvent L, corresponding to the continuous phase of the dispersion. Such compounds of formula II from the group of fatty acids or fatty acid esters are solids with low melting points at room temperature or oils. In addition to fatty acids of natural origin or their esters, synthetically produced acids, such as 2-ethylhexanoic acid can be used (see Kirk-Othmer, Encyclopedia of Chemical Technology, 3rd Ed., Vol. 4, pp. 814–871, J. Wiley, New York, 1978).

Particularly preferred are the $C_8$ to $C_{14}$ fatty acids, such as caprylic acid ($C_8$ fatty acid), pelargonic acid ($C_9$ fatty acid), capric acid ($C_{10}$ fatty acid), lauric acid ($C_{12}$ fatty acid), or myristic acid ($C_{14}$ fatty acid). For the preparation and for the availability of the corresponding fatty acid esters, see, for example, Kirk-Othmer, loc. cit., Vol. 9, pp. 311–337, J. Wiley, New York, 1980.

In a third preferred specific embodiment of the invention, mineral oils are used as a solvent. Preferably, they are selected from the group consisting of gas oils with a boiling range of 225°–350° C., such as the product Shell gas oil G07, which are used in quantities of 70 to 100 wt %, wherein the remaining fractions of solvent L of up to 30 wt % can be substituted with esters, such as butyl acetate.

As emulsifiers, which are preferably used in fractions of 0.1 to 10 wt %, based on monomers M, preferably block copolymers with polystyrene fractions BCP are used, with a particular preference for block polymers BCP, synthesized from styrene and a hydrogenated polyisoprene or a hydrogenated polybutadiene. The block polymers BCP generally contain 20 to 80 wt % polystyrene blocks, in addition to the ethylene-co-propylene blocks or ethylene-co-butylene blocks, which are produced from the hydrogenation of polyisoprene or polybutadiene. Examples include the hydrogenated styrene-isoprene block copolymers of the SHELLVIS® type from the Shell Company. The block copolymers BCP generally have an average molecular weight $M_w$ in the range $3 \times 10^4$ to $2 \times 10^5$, preferably between $7 \times 10^4$ and $1.3 \times 10^5$, d (for the determination of $M_w$, see, for example, H. F. Mark et al., Encyclopedia of Polymer Science and Technology, Vol. 10, pp. 1–19, J. Wiley, New York, 1987).

The monomers M used in accordance with the invention generally make up 20 to 60 parts by weight; the solvents L used as a continuous phase of the dispersion, usually 80 to 40 parts by weight; and the emulsifiers, preferably the block copolymers with polystyrene fractions BCP, 0.05 to 5 parts by weight; wherein all fractions of the reaction mixture, including the radical initiators IN and the molecular weight regulators RM, make up 100 parts by weight.

As radical initiators IN, initiators in quantities of 0.01 to 2 wt %, based on monomers M, which are, in fact, known, are used for the radical polymerization (see H. Rauch-Puntigam, Th. Voelker, *Acryl- und Methacrylverbindungen* [*Acrylic and Methacrylic Compounds*], Springer, Heidelberg, 1967). Preferred radical initiators IN are percarboxylic acid esters, such as bis(4-tert-butylcyclohexyl) peroxydicarbonate, dicyclohexyl peroxydicarbonate (commercially available under the trade name INTEROX® BCHPC or INTEROX® CHPC from the Peroxidchemie Company), diisopropyl peroxydicarbonate, and particularly preferred, tert-butyl perneodecanoate, optionally dissolved in a suitable solvent, such as butyl acetate (see Brandrup-Immergut, Polymer Handbook, 3rd Ed., Part II-1, J. Wiley, New York, 1989).

As suitable molecular weight regulators RM, those which are conventional may be used, in quantities of 0.05 to 5 wt %, preferably 0.1 to 2 wt %, based on the monomers used (see in this regard also, H. Rauch-Puntigam, Th. Voelker, *Acryl- und Methacrylverbindungen*, Springer, Heidelberg, 1967). Preferred molecular weight regulators RM are mercaptans R'-SH, wherein R' is cyclic, or branched alkyl group of 2 to 20 carbon atoms, such as n-butyl mercaptan, n-dodecyl mercaptan, or tert-dodecyl mercaptan, or esters of thioglycolic acid.

In the implementation of the method, one preferably begins with a liquid, generally homogeneous, mixture of all components. Appropriately, the mixture is heated and the polymerization is triggered by the addition of the initiator IN.

In particular, for example, the following procedure may be used. The polymerization is carried out in a reactor suitable for precipitation polymerization with smaller batches, for example, a 500-mL four-neck flask with condenser, thermometer, stirring, and protective gas inlet device. In general, the polymerization is carried out under a protective gas, such as argon. Solvent L, monomers M, and the emulsifier, in particular the block copolymers BCP, are placed in the reactor; for example, 150 parts by weight solvent L, based on 100 parts by weight monomers M. Subsequently, the reaction mixture is heated, such as to 60° to 70° C. When the selected internal temperature is reached, the polymerization is started, while stirring, by adding the initiator, preferably dissolved in solvent L or perhaps in small quantities of a suitable solvent different from L, such as butyl acetate. Usually, the internal temperature of the reactor rises after a short time, for example after 1 min wherein the solution, which was clear up to then, turns turbid. After approximately 5 min, the batch appears white, generally. As a typical precipitation polymerization, the polymerization takes place rather quickly, so that good cooling and stirring must be provided for. After 1 h, polymerization may be almost complete. For the subsequent reaction, a temperature of 80° C. is maintained, while stirring, for a certain time, for example, approximately 1 h, and cooling takes place, while stirring, to temperatures in which in particular the solvents L of formula II are still liquid. The dispersion thus obtained is almost completely coagulate-free. Monodisperse polymer particles are obtained in the indicated size range of 1 to 20 µm, which can be separated, for example, by filtration. It is generally recommended that the filter cake be rewashed once again, for example, with methanol. Another route for the isolation of the monodisperse polymer particles from the solvent L is to distill off the solvent L, preferably under a vacuum, while assuring that the solvent temperature does not exceed the Vicat softening temperature VET of the polymer particles.

The polymers produced according to the method described above exhibit Vicat softening temperatures VET according to ISO 306 between 20° and 120° C., preferably between 30° and 110° C., and specific viscosities in chloroform at 25° C. according to DIN 51562 between 10 and 150 cm³/g, preferably between 20 and 100 cm³/g, corresponding to average molecular weights $M_w$, between $10^4$ and $4 \times 10^5$, preferably between $3 \times 10^4$ and $2.5 \times 10^5$, d (correlation of $M_w$, and specific viscosity according to Mark-Houwink, calibration standard PMMA; for the determination of $M_w$, see H. F. Mark, loc. cit., see above).

The dispersions with the monodisperse polymer particles in accordance with the invention exhibit excellent film-forming characteristics because of the uniform particle size.

Preferably, the film formation takes place on the surfaces of the substrates to be coated at temperatures above the Vicat softening temperature VET of the polymer particles, with particular preference, at temperatures at least 10° K, preferably 20° K, above the VET.

The dispersions with the monodisperse polymer particles in accordance with the invention can be applied with different methods on the surfaces to be coated (see in this regard, Kirk-Othmer, Encyclopedia of Chemical Technology, 3rd Ed., Vol. 6, pp. 386–426, J. Wiley, New York, 1975). Preferably the dispersions are applied, for example, with brushes, doctors, spray nozzles, notched transfer rollers, or by immersion coating onto the surfaces to be coated. The construction of the drying zone, in which the film formation occurs by the melting of the polymer particles, is very important. The drying of the films, that is, the removal of the solvent L, can be attained by contact drying, such as preferably by heating the substrate to be coated, for example, with heated air or with steam, or by indirect drying, such as preferably by convection dryers, which accelerate the evaporation of the solvent L, or by drying in a high-frequency field (see Kirk-Othmer, loc. cit., Vol. 6, pp. 422–425).

In a particularly preferred embodiment of the invention, the monodisperse polymer particles are first isolated as a powder from the dispersion and applied onto the surface to be coated by means of a powder coating method. The powder coating takes place in a preferred specific embodiment of the invention by electrostatic coating, by providing the powder particles with an electrostatic surface charge, spraying them onto the grounded metal surface, and subsequently melting them (see in this regard, Kirk-Othmer, loc. cit., Vol. 6, p. 412). The surface coating takes place with particular preference in a two-stage process, in which the solvent or dispersant is removed in the first stage, and the melting of the particles takes place with a supply of energy, for example, by heating in a drying oven, in a second stage, when at least 90% of the solvent/precipitant has been removed.

With nonmetallic surfaces, such as textile fibers or textile fabrics, the powder can be applied mechanically, for example, by means of vibrating screens, onto the substrate, which is preferably moistened to improve adhesion and subsequently can be melted by a heat treatment to form a cohesive film on the substrate.

The polymer particles-powder in accordance with the invention can preferably also be components of coatings made of plastisols or high-solid lacquers, wherein the plastisols are preferably used for the production of coatings with a thickness of at least 50 μm.

The broad number of parameters which can be varied to regulate the particle size is of particular advantage, as described below.

a) The polarity of the solvent L can be regulated in the case of cyclohexane-containing solvents or in the case of mineral oils by the addition of polar solvents, such as butyl acetate, or can be regulated by the ratio of hydrocarbon to carboxyl group with solvents L of formula II. The following is valid for comparable monomers M: the higher the polarity of the solvent, the larger will be the average particle diameters.

b) The polarity of the monomers: the more the polarity of the monomers M approaches the polarity of the solvent L, the larger will be the average particle diameters.

c) The solids content: the higher the solids content of the polymerization batches, the larger will be the average particle diameters.

d) The polymerization temperature: the higher the polymerization temperature, the larger will be the average particle diameters.

Furthermore, the average particle diameter can be regulated by the type and quantity of the polymerization initiator IN, and by the type and quantity of the emulsifier BCP.

Also advantageous is that with the coating method in accordance with the invention, a high uniformity of the layer thickness and excellent characteristics of the layer surfaces, such as extensive freedom from defects and, consequently, high surface protection and high luster, can be attained because of the uniform particle size of the dispersion particles and their excellent melting capacity already with thin coatings.

The polymer particles isolated from the dispersion can be used with particular advantage for solvent-free coatings, for example, as powder lacquers or for methods with electrostatic binder powder application. Here too, influenced by the uniform particle diameter, a clear savings in material with thinner layers and good protective effect for them is possible.

The following example is intended to illustrate the invention.

EXAMPLE 1

Production of polymethacrylate particles and coating 142.17 g mineral oil EXXSOL® D100S
37.15 g methyl methacrylate
21.67 g butyl methacrylate
3.10 g butyl acrylate
0.62 g dodecyl mercaptan as a molecular weight regulator, and
0.77 g styrene-isoprene block copolymer SHELLVIS® 50 (Shell Company)

are mixed in a three-neck flask (500 mL), equipped with condenser, argon inlet, thermometer, and stirrer, heated to 75° C.

When the internal temperature has reached 75° C., the polymerization is triggered by the addition of 0.93 g tert-butyl perneodecanoate (dissolved 75% in aliphatics). After 2 min, the temperature rises to 77° C. The previously clear solution becomes turbid; after 5 min, the batch appears white. After 20 min, the internal temperature has risen to 78° C. and is kept constant at this temperature level. For the subsequent reaction, stirring is carried out at 80°–85° C. for one more hour. Subsequently, the mixture is cooled while stirring is continued.

The formed dispersion is almost completely coagulate-free; the particles obtained are monodisperse and exhibit an average particle diameter of 4 μm. The solid is isolated in a vacuum from the dispersion by filtering, sedimentation, or decanting, and subsequent drying at room temperature.

A 5% dispersion in cyclohexane is produced with the 4 μm-large particles obtained in this way. A glass plate is coated with the white, thinly liquid dispersion thus prepared.

The cyclohexane is allowed to evaporate (1 day at room temperature). A uniform white coating is obtained. In this state, the particles can be recognized individually as a well-ordered composite under the microscope. Subsequently, a closed, glass-clear coating is obtained by heating in the drying oven (30 min at 100° C.).

What is claimed as new and desired to be secured by Letters Patent of the United States is:

1. A method for the production of surface coatings from monodisperse poly(meth)acrylate particles, which comprises coating a surface with only said particles, wherein said particles are produced by precipitation polymerization of monomer units in a halogen-free solvent in the presence of a block copolymer to form a dispersion of said particles, and wherein the poly(meth)acrylate particles are synthesized from said monomer units, which contain at least 60 wt % monomer units of formula I:

wherein R is hydrogen or methyl, and $R_1$ is an alkyl radical of 1 to 8 carbon atoms, or a substituted aryl radical, or an aralkyl radical, and wherein the poly(meth)acrylate of said particles has a Vicat softening temperature according to ISO 306 of between 30° and 110° C., a specific viscosity in chloroform at 25° C., according to DIN 51562, of between 10 and 150 cm³/g, and wherein the diameters of said particles are in the range 2–20 μm.

2. The method for the production of surface coatings in accordance with claim 1, comprising applying the coating as said dispersion of said particles in said solvent, evaporating the solvent without agglutination of the particles, and heating the surface to at least 10° K above the Vicat softening temperature of the poly(meth)acrylate to form a cohesive surface coating.

3. The method for the production of surface coatings according to claim 1, wherein prior to coating, the particles are isolated from said dispersion as a powder and the powder is subsequently applied on the substrate to be coated and is melted to form a coherent surface coating by heating.

4. The method according to claim 1, wherein the particles have diameters in the range of 3 to 12 μm.

5. The method according to claim 1, wherein the monomers consist of at least 20 wt % methyl methacrylate.

6. The method according to claim 1, wherein the block copolymer is a block copolymer of styrene and hydrogenated isoprene or butadiene.

7. The method according to claim 1, wherein the halogen-free solvent consists of at least 70 wt % cyclohexane.

8. The method according to claim 1, wherein the halogen-free solvent consists of a compound of formulas II or III:

$$R_2-C(=O)-O-R_3 \quad (II)$$

$$R_4-OH, \quad (III)$$

wherein $R_2$ is a straight-chain or branched alkyl radical of 5 to 23 carbon atoms, $R_3$ is hydrogen or a straight-chain or branched alkyl radical of 1 to 15 carbon atoms, and $R_4$ is a straight-chain or branched, saturated alkyl radical of 10 to 22 carbon atoms.

9. The method according to claim 1, wherein the halogen-free solvent consists of a mineral oil selected from the group consisting of gas oils with a boiling range of 225° to 350° C. according to DIN 51567.

10. The method according to claim 1, wherein the monomers contain 1 to 80 wt % aryl or aralkyl (meth)acrylates, said aryl or aralkyl containing 6 to 14 carbon atoms.

* * * * *